Figure 1:
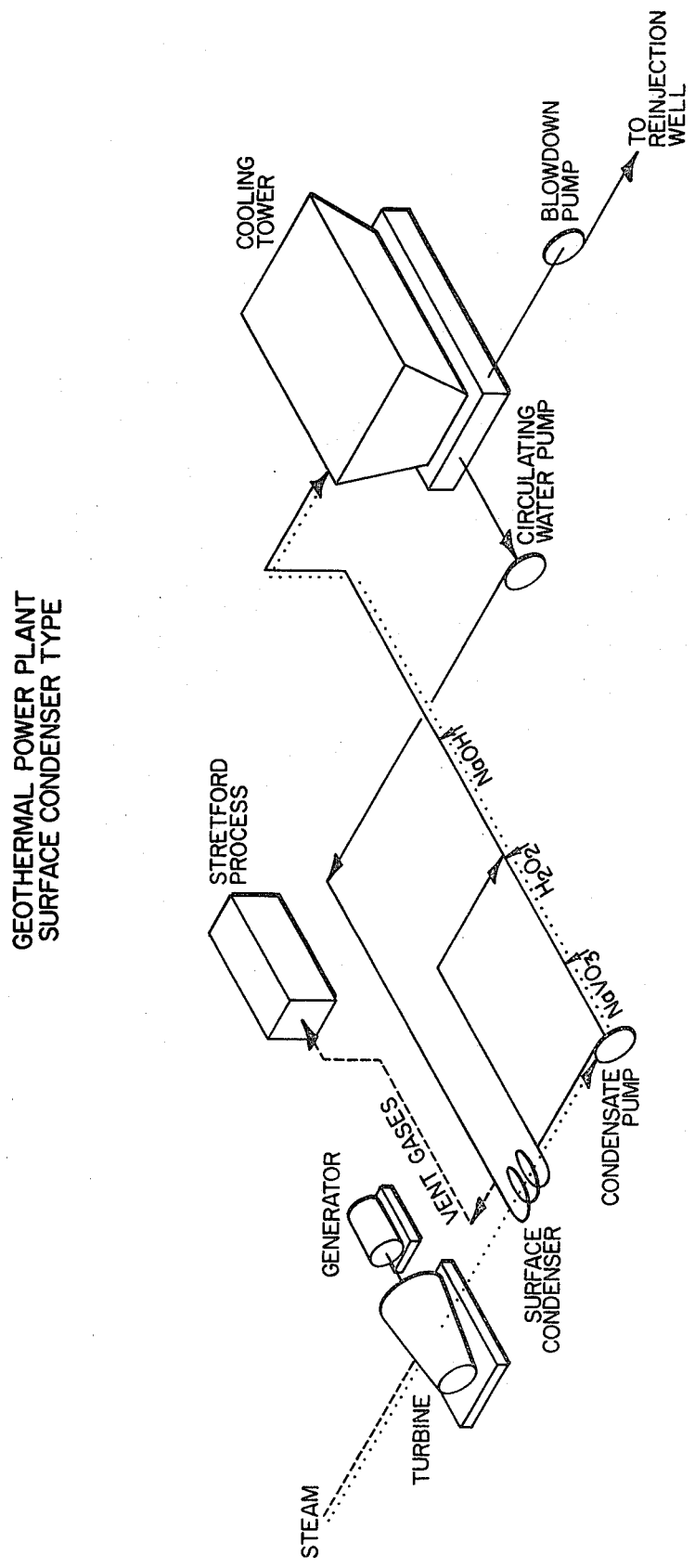

United States Patent [19]

Hills et al.

[11] 4,361,487
[45] Nov. 30, 1982

[54] CONTROL OF HYDROGEN SULFIDE EMISSION FROM GEOTHERMAL STEAM PLANTS WITH HYDROGEN PEROXIDE AND SODIUM VANADATE

[75] Inventors: William A. Hills, Lawrenceville; Richard A. Brown, Trenton, both of N.J.

[73] Assignee: FMC Corporation, Philadelphia, Pa.

[21] Appl. No.: 232,603

[22] Filed: Feb. 9, 1981

[51] Int. Cl.³ .............................................. C02F 1/72
[52] U.S. Cl. .................................... 210/759; 210/763; 423/224; 423/561 R; 423/571; 423/573 R
[58] Field of Search .............. 423/220, 224, 234, 573, 423/574, 571, 561, DIG. 19; 210/758, 759, 761–763; 60/641.3, 64.5

[56] References Cited

U.S. PATENT DOCUMENTS

| | | |
|---|---|---|
| 3,097,926 | 7/1963 | Nicklin et al. ................... 423/573 |
| 3,471,254 | 10/1969 | Urban ................................ 423/571 |
| 3,716,620 | 2/1973 | Deschamps et al. ............. 423/228 |
| 3,941,875 | 3/1976 | Tsuruta et al. ................... 423/571 |
| 3,969,479 | 7/1976 | Lonnes et al. ................... 423/210 |
| 3,972,989 | 8/1976 | Fenton et al. ................. 423/573 G |
| 4,151,260 | 4/1979 | Woertz ............................. 423/224 |
| 4,163,044 | 7/1979 | Woertz ............................. 423/224 |
| 4,192,854 | 3/1980 | Harvey et al. ................... 423/220 |
| 4,259,300 | 3/1981 | Lieffers ......................... 423/238 X |

FOREIGN PATENT DOCUMENTS 280165 10/1928 United Kingdom ........... 423/573 L
421970 1/1935 United Kingdom ............... 423/220

OTHER PUBLICATIONS

Castrantas, H. M., et al, "Hydrogen Sulfide Abatement at Geothermal Wells," presented at Geothermal Environmental, Seminar, sponsored by Lake County, California Air Pollution Board, Oct. 28, 1976.

Castrantas, "The Use of Hydrogen Peroxide to Abate Hydrogen Sulfide in Geothermal Operations," Paper SPE 7882 presented at the 1979 SPE of AIME International Symposium on Oilfield and Geothermal Chemistry, Houston, TX 1979.

Schumb et al, "Hydrogen Peroxide, " Reinhold Publishing Company, New Yor5, 1955, pp. 497 & 498.

Primary Examiner—Earl C. Thomas
Attorney, Agent, or Firm—Richard E. Elden; Robert W. Kell; Frank Ianno

[57] ABSTRACT

Removing hydrogen sulfide from geothermal steam condensate is described whereby the hydrogen sulfide that is present in the condensate from a geothermal steam plant is oxidized with a peroxygen compound such as hydrogen peroxide in the presence of catalytic quantities of sodium vanadate under neutral to alkaline conditions.

10 Claims, 2 Drawing Figures

GEOTHERMAL POWER PLANT
SURFACE CONDENSER TYPE

CONTROL OF HYDROGEN SULFIDE EMISSION FROM GEOTHERMAL STEAM PLANTS WITH HYDROGEN PEROXIDE AND SODIUM VANADATE

This invention relates to the control of hydrogen sulfide emissions from geothermal steam plants. More particularly, this invention relates to a process for oxidizing hydrogen sulfide that is present in geothermal steam condensate in a simple and convenient manner, to provide an effluent that may be discharged directly to the ground without harmful effect.

With the decreasing availability of fossil energy sources, geothermal steam has assumed increased importance. Exploration has now opened up new fields, and known fields are being rapidly developed by drilling new wells. During the actual drilling of the well and until the well is finished and tested, the steam is generally vented to the atmosphere through a buffer to abate noise. After the well is brought in and the particulate matter that is present in the steam from new wells is blown off, the geothermal steam is conveyed to pipes that are usually laid on the surface of the ground to the steam turbines of a power generating plant.

Geothermal steam contains non-condensable gases including carbon dioxide, hydrogen sulfide, hydrogen, methane, nitrogen, ammonia and boric acid. Most geothermal steam turbines are equipped with direct contact condensers which complicates environmental control because they provide two pathways for the effluent to return to the environment. At Geysers California high pressure steam field, the steam contains between 10 and 572 parts per million (ppm) hydrogen sulfide. Pollution of the environment by hydrogen sulfide has been offensive to communities surrounding the polluting source because of its noxious presence in the atmosphere and because of its harmful effect on natural habitat.

Much of the effort that has been expended to overcome environmental problems that are encountered in the utilization of geothermal steam in power plants has been directed to treatment of the effluent stream from the turbine exhaust and to the treatment of non-condensable gases in the case of the condensing turbine plants. One of the earliest methods for the treatment of non-condensable gases was the incineration method. In this method, toxic hydrogen sulfide is converted to less toxic and less offensive sulfur dioxide and sulfur trioxide by air oxidation at high temperatures. While this process converts hydrogen sulfide into sulfur dioxide, the sulfur dioxide is still noxious and potentially dangerous to the environment.

To avoid the problems associated with the incineration method, numerous chemical processes have been suggested. U.S. Pat. No. 3,716,620 discloses the oxidation of hydrogen sulfide and thiols with iodine in the presence of an organic solvent. While this process is technically effective in oxidizing hydrogen sulfide, the process is not commercially feasible because the compounds used are expensive and even small losses of these compounds make the process commercially uneconomical.

British Pat. No. 421,970 discloses a four-stage process for oxidizing hydrogen sulfide with hydrogen peroxide. In the first stage, hydrogen sulfide is absorbed in an alkaline solution. In the second stage, the solution is acidified by treatment with carbon dioxide. In the third stage, the solution is boiled to expel most of the absorbed hydrogen sulfide. In the fourth stage, the solution is treated with an oxidizing agent to oxidize the remaining hydrogen sulfide. While the patentee states that a tenfold reduction of hydrogen sulfide in the scrubber effluent is achieved in 15 minutes, this process is not a commercially feasible process, primarily because of the time necessary to perform the complete process.

Recently, the hydrogen sulfide removal from geothermal steam has been improved with successful testing of the Stretford process, adapted from a similar application in the coal gas industry. The Stretford process depends upon scrubbing the gas with suitable solvents, with subsequent catalytic oxidation.

Although the prior art discloses processes for the removal of hydrogen sulfide from geothermal steam, there has been a long felt need for a commercially effective, efficient and simple process capable of rapidly removing hydrogen sulfide from geothermal steam condensate in a simple and conventional manner without the formation of by-product pollutants. In accordance with the present invention, there is provided a process for reducing the amount of hydrogen sulfide in the effluent stream from the turbine exhaust of geothermal steam plants by oxidizing the hydrogen sulfide present in the steam condensate with hydrogen peroxide in the presence of a vanadate catalyst.

The technology referred to above primarily relates to the removal of hydrogen sulfide from an aqueous stream to diminish or eliminate the discharge of significant amounts of hydrogen sulfide in the effluent stream without interfering with the efficient utilization of geothermal steam in power plants. It is an object of the present invention to treat the spent steam in power plants of the condensing or non-condensing type subsequent to energy derivation therefrom.

In accordance with the present invention the hydrogen sulfide that is present in spent steam condensate is oxidized with a peroxygen compound such as hydrogen peroxide in the presence of a vanadate catalyst under neutral to alkaline conditions.

Although hydrogen peroxide is the preferred oxidizing agent, other peroxygen compounds such as sodium carbonate peroxide, sodium perborate, sodium pyrophosphate peroxide, urea peroxide, and sodium peroxide are effective when dissolved in water and added to the condensate.

The steam condensate is adjusted to a pH of 7.0 or above with an alkaline reagent such as sodium hydroxide, or potassium hydroxide. Other alkaline reagents are also effective, among them ammonium hydroxide, and solutions of sodium carbonate, potassium carbonate, sodium bicarbonate, potassium bicarbonate, calcium hydroxide, magnesium hydroxide, sodium peroxide and sodium carbonate peroxide.

The invention will be more readily understood by reference to the drawings which are flow diagrams of the process of the present invention as employed in a commercial geothermal steam turbine generating plant. Referring to FIG. 1 which identifies the primary components of a surface condensing type of geothermal steam power plant, the geothermal steam enters the turbine directly from the wells and vent gases from the turbine are treated by the Stretford process. Steam from the turbine, which is at a temperature of 160° C.–180° C. and contains 50–80 parts per million of dissolved hydrogen sulfide passes under reduced pressure to a surface contact condenser where it is condensed and cooled by the liquid condensate from the cooling tower to a temperature below 60° C. A concentrated aqueous solution of sodium hydroxide is introduced into the line from the condenser at a rate which maintains the pH of the effluent from the cooling tower between about 7.0 and about pH 9.0. Sufficient sodium vanadate is added to the line from the condenser as an aqueous solution to give a catalyst concentration of from about 0.5 to about 3 parts per million in the effluent from the cooling tower. The rate of sodium vanadate may be reduced as equilibrium is reached to replace only that amount of catalyst that is drained from the cooling tower with the effluent and maintain the catalyst concentration within the range 0.5 to 3.0 parts per million.

An aqueous solution of hydrogen peroxide is introduced to the line from the condenser at such a rate that the concentration of hydrogen sulfide in the concentrate is reduced to an amount that will permit the discharge of the effluent from the cooling tower to the ground. The oxidation is largely completed at the time that the effluent from the condenser enters the cooling tower (about 15 seconds). In a geothermal steam plant that is operated at a flow rate of about 450,000 kilograms per hour of geothermal steam to the turbine, the hydrogen sulfide in the steam condensate may be reduced to less than 10 parts per million and discharged from the cooling tower at the rate of 362,000 kilograms per hour.

Figure 2:
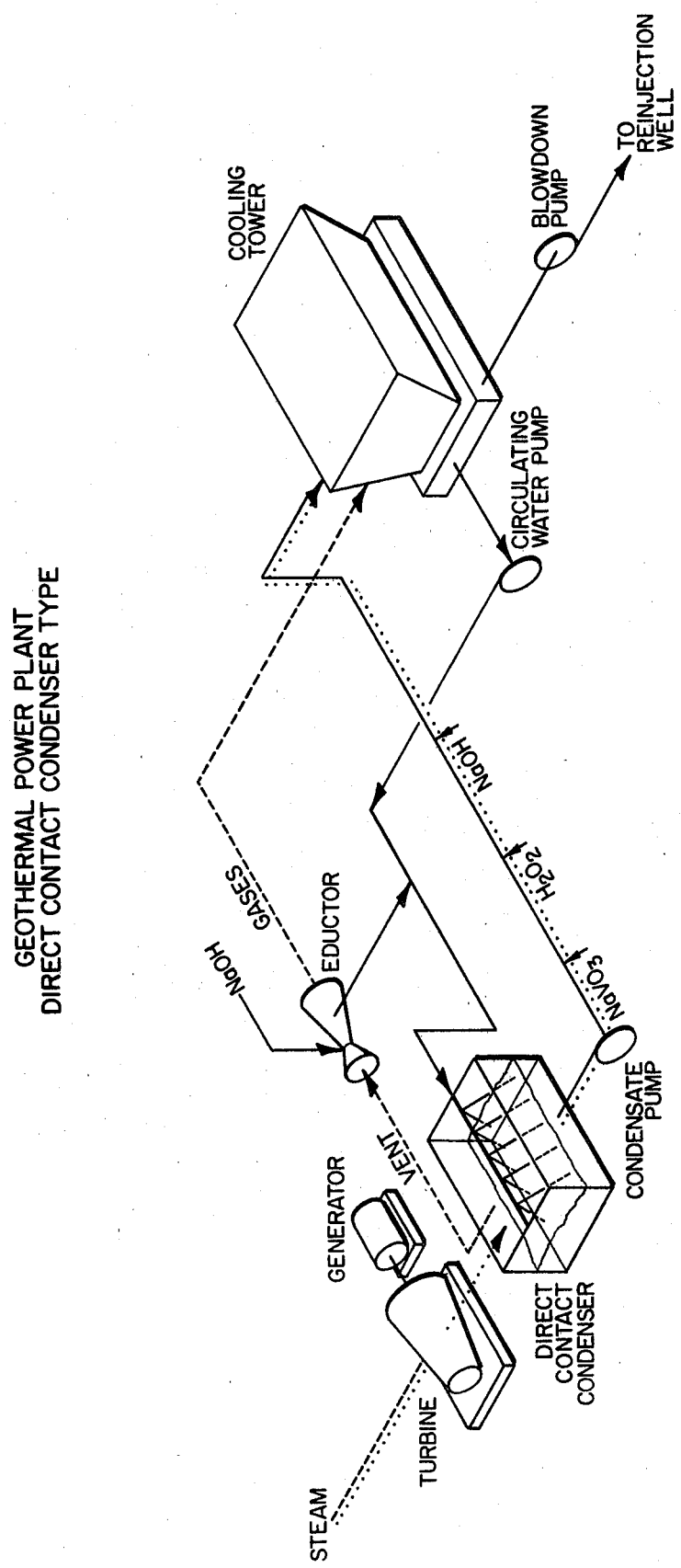

FIG. 2 is a flow diagram of the process of the present invention as employed in a direct contact condenser type of geothermal steam turbine generating plant. Referring to FIG. 2, the geothermal steam enters the turbine directly from the wells. Vent gases from the turbine are treated with an aqueous sodium hydroxide solution (e.g., 10% to 50% NaOH) as they pass through the venturi of an eductor and are scrubbed in the cooling tower before escaping to the atmosphere. Steam from the turbine passes under reduced pressure into the direct contact condenser where it is sprayed with steam condensate from the cooling tower that is mixed with the aqueous sodium hydroxide solution from the eductor. The sodium hydroxide solution at the eductor is added at a rate that is sufficient to neutralize the hydrogen sulfide in the steam. With a steam flow of about 410,000 Kg/hr, containing 100 ppm of hydrogen sulfide, a 50% solution of sodium hydroxide would be added at the rate of 97 Kg/hr. This maintains the pH of the condensate at the bottom of the cooling tower within the range of 8.0 to 9.5. Steam condensate from the condenser is pumped to the top of the cooling tower and the cooled condensate at a temperature of about 55° C., is recirculated to the condenser at the rate of about 9,600,000 Kg/hr. Sufficient sodium vanadate is added to the cooled condensate as it passes from the bottom of the condenser to the top of the cooling tower to provide a catalyst concentration of from about 0.5 to about 3.0 parts per million and 30% aqueous hydrogen peroxide is introduced into this cooled condensate at the rate which will provide an effluent that may be discharged directly to the ground without harmful effect. The oxidation of the hydrogen sulfide is substantially complete within 15 seconds after addition of the hydrogen peroxide. The excess condensate beyond that required for operation of the cooling tower and direct contact condenser contains less than 2 ppm of hydrogen sulfide and may be discharged directly to the ground.

Although the present invention is not to be restricted by any theory of operation, it is believed that the hydrogen sulfide present in the steam condensate is first neutralized in systems containing a base such as sodium hydroxide or sodium carbonate. The sulfide is then oxidized according to the reactions outlined below.

$H_2S + NaOH \rightarrow NaHS + H_2O$      1.

$NaHS + 2NaVO_3 \rightarrow Na_2V_2O_5 + NaOH + S$      2.

$Na_2V_2O_5 + H_2O_2 \rightarrow 2NaVO_3 + H_2O$      3.

Overall Reaction $H_2S + H_2O_2 \rightarrow S + 2H_2O$      4.

Thus, other water soluble salts that form the vanadate ion in solution, such as potassium vanadate and vanadium pentoxide, may be substituted for the sodium vanadate as catalyst.

As indicated above, although hydrogen peroxide is the preferred oxidizing agent, other peroxygen compounds such as sodium carbonate peroxide, sodium perborate, sodium pyrophosphate peroxide, urea peroxide and sodium peroxide are effective when dissolved in water and injected into the condenser. The preferred peroxide is hydrogen peroxide which may be added as any of its commercially available aqueous solutions, e.g., 30%, 50% or 70% hydrogen peroxide. For reasons of economy, safety and convenience, a 30% aqueous solutions of hydrogen peroxide is generally used.

The molar ratio of the hydrogen peroxide added to the hydrogen sulfide present in the steam condensate may vary from 1:1 to 3:1 with excellent results being obtained employing a molar ratio of 1:1. Higher amounts of hydrogen peroxide may be employed but do not improve the efficiency of hydrogen peroxide usage.

As indicated above, any vanadium compound may be employed as a catalyst which is soluble in water to form the vanadate ion. The catalyst concentration may vary from about 0.5 to about 3.0 mg/Kg (0.5–3.0 parts per million) depending upon the pH of the condensate with excellent results being achieved at pH's between 7.0 and 9.0 when the concentration of sodium vanadate is 1 part per million.

The volume of the condensate returning from the cooling tower and entering the condenser is usually sufficient during plant operation to reduce the temperature of the condensate within the condenser to about 55° C.

The presence of the vanadate catalyst greatly increases the efficiency of the oxidation of hydrogen sulfide by hydrogen peroxide. Hydrogen sulfide is oxidized with hydrogen peroxide in alkaline solutions to sulfate. Theoretically, this requires 4 parts of hydrogen peroxide for 1 part hydrogen sulfide. Under acidic conditions (pH less than 7.0), elemental sulfur is formed. This requires only 1 part hydrogen peroxide to 1 part hydrogen sulfide. At intermediate pH's (pH 7.0 to pH 8.2), sulfur, sulfate and polysulfide are formed. The use of a vanadate catalyst allows the oxidation of hydrogen sulfide to elemental sulfur at strongly alkaline pH's where sulfide is best absorbed while conserving the amount of peroxide needed for carrying out the oxidation. Since the vanadate ion is regenerated by the peroxide, only a catalytic amount of vanadate is required. The colloidal sulfur can then be returned to the ground or removed from the system if required in geothermal installations.

The present invention will be further illustrated by the following Examples wherein reacting quantities are expressed as parts by weight unless otherwise indicated.

EXAMPLE I

Removal of Hydrogen Sulfide With Hydrogen Peroxide and Sodium Vanadate

To a solution containing 0.013 g of sodium carbonate and 4.80 g of sodium bicarbonate in 250 ml of deionized water was added gaseous hydrogen sulfide until the concentration of the hydrogen sulfide was 0.15 mg/Kg (0.15 parts per million) as measured with a LaMotte CC-PS Chemical Test Kit. One drop of a 10% aqueous solution of sodium vanadate was added to this solution. A 30% aqueous solution of hydrogen peroxide was then added with stirring until the concentration of hydrogen peroxide (determined by titration with 0.1 N ceric sulfate solution) was 0.15 mg/Kg. Colloidal sulfur was formed immediately in a clear solution. Measurement of the total sulfide concentration with a LaMotte CC-PS Chemical Test Kit showed the sulfide ion to be completely removed.

EXAMPLE II

Removal of Hydrogen Sulfide With Hydrogen Peroxide and Sodium Vanadate as a Function of pH, Vanadium Concentration and the Mole Ratio of Peroxide to Sulfide Fifty milliliters of distilled water containing 60 mg/Kg of sulfide ion was placed in a 200 ml beaker and the contents heated to 50° C. in a thermostatically controlled water bath. The pH was adjusted to the desired level (pH 7.0 or pH 9.0) with 1 Normal aqueous sodium hydroxide. The pH was measured with an Orion Research Model 701A-Digital Ion Analyzer. Varying quantities of 30% aqueous hydrogen peroxide were added to the solution dropwise with stirring and the concentration of the residual hydrogen sulfide was determined at the end of 10 minutes with a LaMotte CC-PS Chemical Test Kit. The results of this experiment illustrate the effect of varying the mole ratio of hydrogen peroxide to sulfide ion, and of varying the amount of vanadium catalyst at a pH of 7.0 and pH 9.0. The results are summarized in Tables I, II and III. It will be noted that a molar ratio of hydrogen peroxide to hydrogen sulfide of 1:1 was effective in reducing the sulfide concentration when the vanadate catalyst was present at a concentration of 1 mg/Kg (1 part per million).

EXAMPLE III

Rate of Removal of Sulfide

The process described in Example II above was repeated at pH 9.0 with a hydrogen peroxide to hydrogen sulfide molar ratio of 1:1 and 2:1. The amount of sodium vanadate present was 0.5 mg/Kg (0.5 parts per million) in one group of experiments and 1 mg/Kg (1.0 parts per million) in a second group of experiments. The reaction rates (determined at 50° C.) are summarized in Tables IV and V.

EXAMPLE IV

Referring to the flow diagram of FIG. 1, geothermal steam containing 150 ppm hydrogen sulfide enters a turbine generator plant at the rate of 450,000 Kg/hr and the vent gases from the turbine (80% of the entering hydrogen sulfide) is treated by the Stretford process. Twenty percent of the hydrogen sulfide present in the vent gases from the turbine is passed under reduced pressure to a surface contact condenser and cooled by the liquid condensate from the cooling tower to a temperature of 54° C. A 50% solution of sodium hydroxide in water is introduced into the condensate from the condenser at the rate of 29 Kg/hr. This addition maintains the pH of the condensate from the condenser between 8.8 and 9.0. Sodium vanadate is added to the condensate as a 10% aqueous solution at the rate of 4.5 Kg/hr to give a catalyst concentration of about 1 part per million in the steam condensate and addition may be continued at the lesser rate of 0.03 Kg/hr to replace catalyst that is drained from the cooling tower with the effluent and to maintain the catalyst concentration between 1–2 parts per million.

Hydrogen peroxide, as a 30% aqueous solution was added to the condenser condensate at a rate of 41 Kg/hr to maintain the concentration of sulfide in the effluent from the cooling tower below 2 parts per million. The effluent from the cooling tower was drained from the cooling tower at the rate of 97 Kg/hr and may be discharged directly to the ground.

Both the pH and sulfide concentration of the condensate may be continuously monitored and the addition rates automatically controlled. The flow of effluent may be continuously monitored and the addition of sodium vanadate solution may be automatically controlled to maintain the catalyst concentration at no less than 1 part per million.

TABLE I

Sodium Vanadate Catalysis of Hydrogen Sulfide Oxidation*

| Vanadium Conc. mg/Kg | Molar Ratio $H_2O_2:H_2S$ | Sulfide Conc. mg/Kg | % Reduction of Sulfide |
|---|---|---|---|
| 0 | 0 | 60 ppm | — |
| 1 | 1:1 | 7 | 88 |
| 1 | 2:1 | 0.2 | 98 |
| 1 | 3:1 | <0.1 | 100 |
| 0.5 | 1:1 | 7 | 88 |
| 0.5 | 2:1 | 15 | 75 |
| 0.5 | 3:1 | 14 | 77 |
| 0.5 | 4:1 | <0.1 | 100 |
| 0.25 | 4:1 | 2 | 97 |

*Reaction run at pH 9; 50° C.

TABLE II

Sodium Vanadate Catalysis of Hydrogen Sulfide Oxidation*

| Vanadium Conc. mg/Kg | Molar Ratio $H_2O_2:H_2S$ | Sulfide Conc. mg/Kg | % Reduction of Sulfide |
|---|---|---|---|
| 1 | 0 | 15 | — |
| 2 | 0 | 15 | — |
| 3 | 0 | 15 | — |
| 1 | 1:1 | <0.1 | 99 |
| 1 | 2:1 | <0.1 | 99 |

*Reaction run at pH 7; 50° C.

TABLE III

Sodium Vanadate Catalysis of Hydrogen Sulfide Oxidation*

| Vanadium Conc. mg/Kg | Molar Ratio $H_2O_2:H_2S$ | Sulfide Conc. mg/Kg | % Reduction of Sulfide |
|---|---|---|---|
| 1 | 0 | ~10 | — |
| 2 | 0 | ~10 | — |
| 1 | 1:1 | <1 | <90 |
| 2 | 1:1 | <1 | <90 |

*Reaction run at pH 7; 50° C.

TABLE IV*

Rate of Sulfide Removal

| Time (sec) | Sulfide Ion Concentration (mg/Kg) | % Sulfide Removed |
|---|---|---|
| 0 | 80 | — |
| 15 | 38 | 53 |
| 30 | 30 | 63 |
| 60 | 25 | 69 |
| 90 | 24 | 70 |
| 120 | 25 | 69 |
| 180 | 25 | 69 |

*Temperature 50° C.; pH 9; vanadium concentration-1 mg/Kg; ratio $H_2O_2/H_2S$ = 2:1.

TABLE V*

Rate of Sulfide Removal

| Time (sec) | Sulfide Ion Concentration (mg/Kg) | % Sulfide Removed |
|---|---|---|
| 0 | 80 | — |
| 15 | 55 | 31 |
| 30 | 35 | 56 |
| 60 | 28 | 65 |
| 90 | 22 | 73 |
| 120 | 20 | 75 |

*Temperature 50° C.; pH 9; vanadium concentration-0.5 mg/Kg; ratio $H_2O_2/H_2S$ = 2:1.

We claim:

1. A process for removing hydrogen sulfide from the condensate of spent steam in a geothermal power plant which comprises oxidizing said hydrogen sulfide with a peroxygen compound in the presence of a vanadate catalyst under neutral to alkaline conditions.

2. The process of claim 1 wherein the oxidation reaction is conducted with the pH of the steam condensate between about 7.0 and about 9.0.

3. The process of claim 2 wherein the oxidation reaction is conducted at a pH of about 9.0.

4. The process of claim 1 wherein said catalyst is present in the amount of about 0.5 to about 2.0 parts per million.

5. The process of claim 4 wherein said catalyst is present in amounts of about 1 part per million.

6. The process of claim 1 wherein the temperature of the steam condensate is about 50° C.

7. The process of claim 1 wherein the peroxygen compound is hydrogen peroxide.

8. The process of claim 7 wherein the hydrogen peroxide is aqueous 30% hydrogen peroxide.

9. The process of claim 2 wherein the pH of the steam condensate is adjusted to a pH between about 7.0 and about 9.0 through the addition of sodium hydroxide.

10. The process of claim 2 wherein the pH of the steam condensate is adjusted to a pH between about 7.0 and about 9.0 through the addition of potassium hydroxide.

* * * * *